Jan. 10, 1967  J. G. KEENAN ETAL  3,296,804
GAS TURBINE VERTICAL LIFT ENGINE
Filed Aug. 19, 1963  2 Sheets-Sheet 1
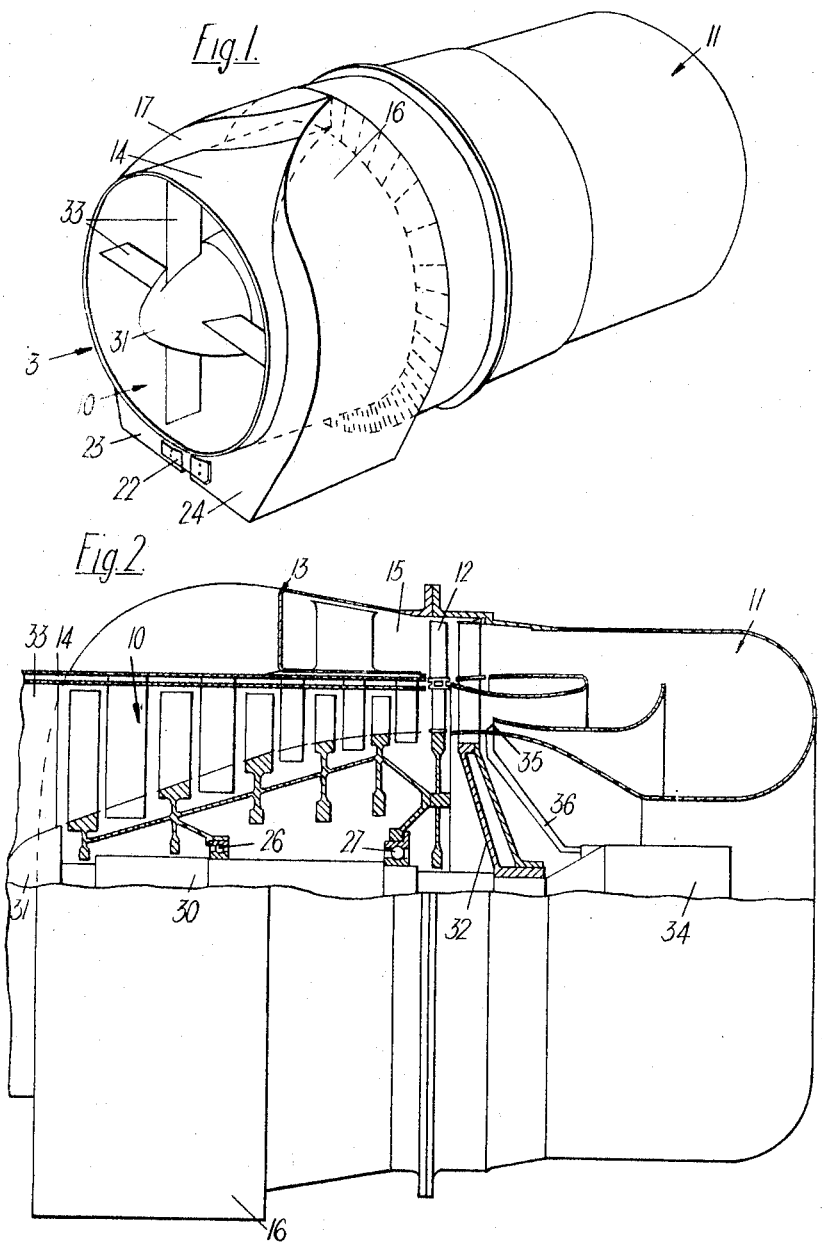

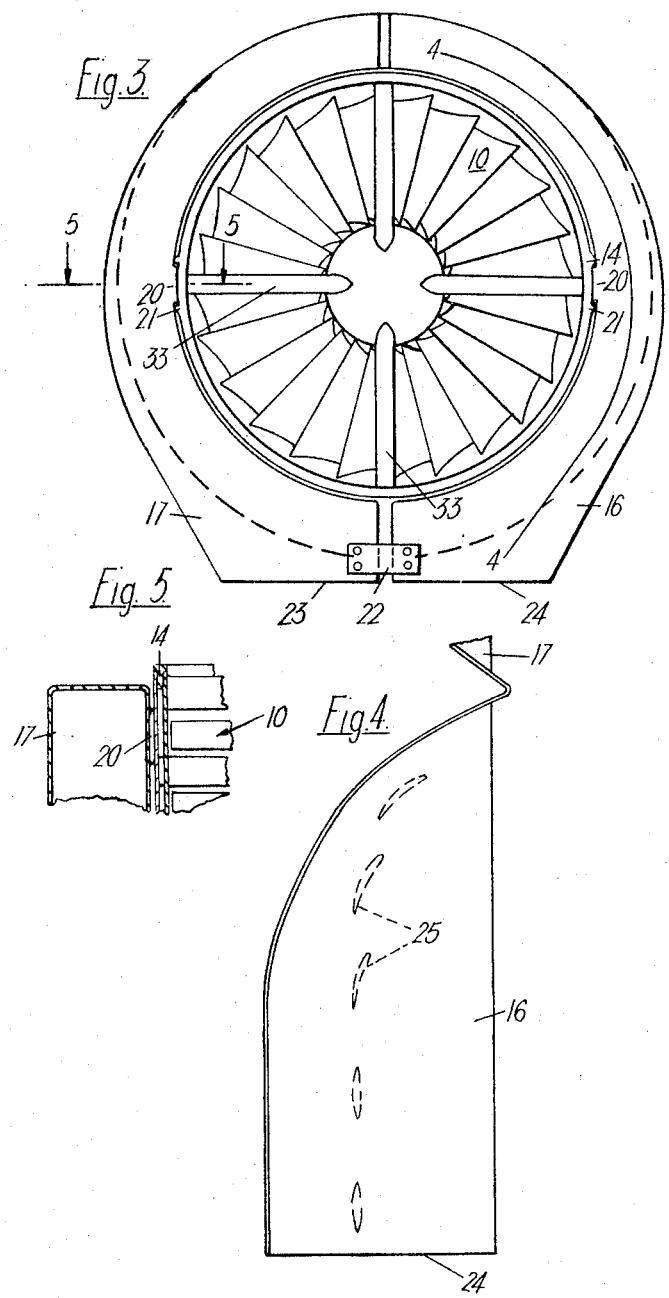

United States Patent Office 3,296,804
Patented Jan. 10, 1967

3,296,804
GAS TURBINE VERTICAL LIFT ENGINE
John Gregory Keenan, Shelton Lock, Derby, and Jack Palfreyman, Derby, England, assignors to Rolls-Royce Limited, Derby, England, a company of Great Britain
Filed Aug. 19, 1963, Ser. No. 302,788
Claims priority, application Great Britain, Aug. 24, 1962, 32,716/62
4 Claims. (Cl. 60—269)

This invention concerns a gas turbine vertical lift engine, that is to say a gas turbine engine which is adapted to produce vertical lift forces on the aircraft independently of those generated aerodynamically by forward flight of the aircraft.

According to the present invention there is provided a gas turbine vertical lift engine having in flow series an axial flow compressor, combustion equipment, a turbine, and an exhaust duct; the exhaust duct having an upstream portion which is concentric with and arranged adjacent to the compressor, and a downstream portion which extends downwardly from the engine when the latter is mounted in a predetermined horizontal position; the construction being such that the turbine exhaust gases are first directed through the said upstream portion in a direction towards the inlet of the compressor, and then pass through the said downstream portion of the exhaust duct so as to be downwardly directed therefrom.

Preferably the combustion equipment is adapted to reverse the direction of flow of the gases passing therethrough so as to cause the latter, after they have passed through the turbine, to flow through the upstream portion of the exhaust duct in a direction towards the inlet of the compressor.

The rotor blades of the turbine are preferably carried by or are integral with at least one rotatable stage of the compressor.

The engine is preferably provided with an axially extending fixed shaft on which the compressor and turbine are rotatably mounted, auxiliary equipment for the operation of the engine being mounted within said fixed shaft.

The auxiliary equipment may comprise fuel pumps and/or a fuel supply control unit for controlling the supply of fuel to the combustion equipment in accordance with one or more engine variables. Additionally or alternatively, the auxiliary equipment may comprise an oil reservoir forming part of a lubricating system of the engine.

Preferably the said downstream portion is divided into two or more parts which respectively extend closely about the casing of the compressor.

The invention is illustrated, merely by way of example, in the accompanying drawings, in which:

FIGURE 1 is a perspective view of a gas turbine vertical lift engine according to the present invention, FIGURE 2 is a side elevation, partly in section, of the said engine, FIGURE 3 is a front elevation of the said engine, FIGURE 4 is a developed view taken on the line 4—4 of FIGURE 3, and FIGURE 5 is a broken away section taken on the line 5—5 of FIGURE 3.

Referring to the drawings, a gas turbine vertical lift engine for use in an aircraft adapted for vertical take-off and landing is adapted to be mounted in the horizontal position shown. The engine comprises in flow series a multi-stage axial compressor 10, a combustion chamber 11, a single stage turbine 12 whose rotor blades are carried by the last rotatable stage of the compressor 10, and an exhaust duct 13.

The compressor 10, which is of lightweight construction and is fabricated largely of synthetic resin materials, has a casing 14 substantially concentric with which and adjacent to which extends an upstream portion 15 of the exhaust duct 13.

The downstream portion of the exhaust duct 13 is bifurcated, adjacent the top of the engine, into two parts 16, 17 which respectively extend closely about the casing 14. Each of the said parts 16, 17 is secured to the casing 14 by being provided with a spigot 20 which is received within a recess 21 in the casing 14.

Each of the said parts 16, 17 is also secured to the casing 14 by a plurality of angularly spaced apart radially extending straps (not shown) which extend around the parts 16, 17. The lower ends of the parts 16, 17 are secured together by a plate 22 and are open so as to provide nozzles 23, 24.

The combustion chamber 11 is formed to reverse the direction of flow of the gases passing therethrough so as to cause the latter, after they have passed through the turbine 12, to flow through the upstream portion 15 of the exhaust duct 13 in a direction towards the inlet of the compressor 10. The gases which have passed through the upstream portion 15 and which have thus flowed concentrically of the compressor 10, then pass through the parts 16, 17 so as to be vertically downwardly directed therefrom through the nozzles 23, 24. Guide vanes 25 are mounted within the parts 16, 17 to assist the deflection of the gases into the vertically downward direction.

The compressor 10 and turbine 12 are rotatably mounted, by means of bearings 26, 27, on an axially extending fixed shaft 30 which, adjacent to the inlet of the compressor 10, is formed integrally with or secured to a nose cone 31. The fixed shaft 30 is, adjacent to the downstream end of the compressor 10, supported from the casing 14 by way of a plurality of angularly spaced apart struts 32, the nose cone 31 being supported from the casing 14 by way of a plurality of angularly spaced apart intake struts 33.

Fuel pumps (not shown) are mounted within the nose cone 31 while an oil reservoir (not shown) is mounted within the fixed shaft 30 centrally of the length thereof. The oil reservoir, which is adapted (by means not shown) to supply oil for the lubricaton of the bearings 26, 27, is adapted to contain a supply of oil which will be sufficient to last throughout a vertical take-off or landing.

The shaft 30, at its end remote from the nose cone 31, has an enlarged diameter portion 34 within which is mounted a fuel supply control unit (not shown) for controlling the supply of fuel to the combustion chamber 11 in accordance with one or more engine variables, e.g. engine speed and a compressor pressure or pressures.

The said supply of fuel passes to fuel injectors 35 within the combustion chamber 11 by way of a fuel supply line 36. The fuel from the fuel injectors 35 may, for example, be directed against fuel impingement plates as disclosed in the specification of our co-pending United States application No. 252,853, filed January 21, 1963 now Patent No. 3,142,961.

Vertical lift engines are commonly mounted vertically. Since, however, the vertical lift engine shown in the drawings is horizontally mounted, full advantage may be taken of ram pressure during the starting of the engine, whereby starting is rendered easier.

The vertical lift engine shown in the drawings is also of short axial length by reason of the reversal of flow of the gases, while the said axial length is arranged horizontally rather than vertically and the engine is therefore easier to accommodate in an aircraft.

The construction shown in the drawings also permits auxiliary equipment, such as fuel pumps, a fuel supply control unit, and an oil reservoir to be of conventional design and to be accommodated with the parts 30, 31, 34, while the said oil reservoir may be designed to contain sufficient oil to render the use of external tanks unnecessary.

We claim:
1. A gas turbine vertical lift engine having in flow series an axial flow compressor having a casing and at least one rotatable stage mounted therein, combustion equipment which reverses the direction of flow of the gases passing therethrough, a turbine having rotor blades which are connected to a rotatable stage of the compressor, and an exhaust duct, structurally separate from the compressor but removably attached thereto, the exhaust duct having an upstream portion which surrounds and is concentric with the compressor casing, and a downstream portion which is divided into two parts which extend closely about the compressor casing on opposite sides thereof and which extend in a direction substantially perpendicular to the axis of the compressor, the turbine exhaust gases being first directed by the said upstream portion of the exhaust duct towards the inlet of the compressor, and then passing through said two parts of the downstream portion of the exhaust duct so as to be downwardly directed when the engine is in a predetermined horizontal disposition.

2. A gas turbine vertical lift engine having in flow series an axial flow compressor having a casing and at least one rotatable stage mounted therein, combustion equipment which reverses the direction of flow of the gases passing therethrough, a turbine having rotor blades which are connected to a rotatable stage of the compressor, and an exhaust duct, the exhaust duct having an upstream portion which surrounds and is concentric with the compressor casing, and a downstream portion which is divided into two parts which extend closely about the compressor casing on opposite sides thereof and which extend downwardly from the engine when the latter is mounted in a predetermined horizontal position, the turbine exhaust gases being first directed by the said upstream portion of the exhaust duct towards the inlet of the compressor, and then passing through said two parts of the downstream portion of the exhaust duct so as to be downwardly directed therefrom, the said two parts of the downstream portion of the exhaust duct being provided with projecting spigots and said compressor casing being provided with sockets in which said spigots are received to locate the exhaust duct.

3. A gas turbine vertical lift engine as claimed in claim 1 having an axially extending hollow fixed shaft on which the compressor and turbine are rotatably mounted.

4. A gas turbine vertical lift engine as claimed in claim 1 wherein a plurality of guide vanes are mounted in the downstream portion of the exhaust duct.

References Cited by the Examiner
UNITED STATES PATENTS

| | | | |
|---|---|---|---|
| 2,668,413 | 2/1954 | Giliberty | 60—39.66 X |
| 2,912,188 | 11/1959 | Singelmann et al. | |
| 2,914,919 | 12/1959 | Varadi | 60—39.66 X |
| 3,088,278 | 5/1963 | Franz | 60—39.31 X |
| 3,117,750 | 1/1964 | Snell | 60—35.6 |
| 3,186,166 | 6/1965 | Grieb | 60—35.6 X |

FOREIGN PATENTS

| | | |
|---|---|---|
| 1,144,879 | 4/1957 | France. |
| 905,136 | 9/1962 | Great Britain. |

MARK NEWMAN, *Primary Examiner.*

D. HART, *Assistant Examiner.*